United States Patent
Liu et al.

(10) Patent No.: US 8,695,446 B2
(45) Date of Patent: Apr. 15, 2014

(54) SYSTEM AND METHOD FOR DETECTING PLUGGAGE IN A CONDUIT FOR DELIVERY OF SOLIDS AND CARRIER GASES TO A FLOWING GAS STREAM

(75) Inventors: Xin Liu, Baton Rouge, LA (US); Jon E. Miller, Uniontown, OH (US)

(73) Assignee: Albemarle Corporation, Baton Rouge, LA (US)

( * ) Notice: Subject to any disclaimer, the term of this patent is extended or adjusted under 35 U.S.C. 154(b) by 323 days.

(21) Appl. No.: 13/003,138

(22) PCT Filed: Jul. 8, 2009

(86) PCT No.: PCT/US2009/049974
§ 371 (c)(1),
(2), (4) Date: Apr. 29, 2011

(87) PCT Pub. No.: WO2010/006077
PCT Pub. Date: Jan. 14, 2010

(65) Prior Publication Data
US 2011/0240150 A1    Oct. 6, 2011

Related U.S. Application Data

(60) Provisional application No. 61/079,033, filed on Jul. 8, 2008.

(51) Int. Cl.
*G01N 19/00* (2006.01)

(52) U.S. Cl.
USPC .......................................................... 73/865.9

(58) Field of Classification Search
None
See application file for complete search history.

(56) References Cited

U.S. PATENT DOCUMENTS

| | | | |
|---|---|---|---|
| 2,695,265 A | 11/1954 | Degnen | |
| 5,367,292 A * | 11/1994 | Szoke et al. | 340/608 |
| 6,113,387 A | 9/2000 | Wilson et al. | |
| 7,249,607 B2 * | 7/2007 | Hansen et al. | 137/1 |
| 7,290,450 B2 * | 11/2007 | Brown et al. | 73/579 |
| 7,302,845 B2 * | 12/2007 | Sood et al. | 73/204.26 |
| 2008/0121743 A1 | 5/2008 | Fleckten et al. | |

FOREIGN PATENT DOCUMENTS

| | | |
|---|---|---|
| EP | 1491261 | 12/2004 |
| JP | 04094720 A | 3/1992 |
| JP | 2008190999 A | 8/2008 |
| RU | 2357913 C2 | 6/2009 |

* cited by examiner

*Primary Examiner* — Robert R Raevis
(74) *Attorney, Agent, or Firm* — Marcy M. Hoefling

(57) ABSTRACT

A process and system for detecting pluggage in a conduit that is feeding a solid and carrier gas to a flowing gas.

7 Claims, 2 Drawing Sheets

SYSTEM AND METHOD FOR DETECTING PLUGGAGE IN A CONDUIT FOR DELIVERY OF SOLIDS AND CARRIER GASES TO A FLOWING GAS STREAM

REFERENCE TO RELATED APPLICATIONS

This application is a 371 of PCT/US09/49974 filed on Jul. 8, 2009, which claims priority to Provisional Patent Application No. 61/079,033 filed Jul. 8, 2008, the disclosure of which is herein incorporated by reference in its entirety.

TECHNICAL FIELD

This invention relates to a process and system that are useful in monitoring for and detecting pluggage in a conduit for delivery of solids, liquids and/or gases through a duct or chamber wall into a flowing gas, where the pluggage may reduce or stop such delivery.

BACKGROUND

The engineering arts have long-used elongated hollow tubes that traverse the walls of gas-stream-carrying ducts or chambers so that the tubes can deliver fine solids entrained in a carrier gas from a source exterior of the duct or chamber to a point interior of the duct or chamber. Such elongated hollow tubes are conventionally referred to as "lances." Generally, lances have a bore through which the solids and carrier gases flow. The bore is in delivery communication with an exterior solid and gas feed source and is open, at a point interior of the duct or chamber, to effect delivery of the solid and carrier gas through the lance bore into the target gas stream.

A difficulty facing the practitioner is pluggage of the lance bore and bore opening(s). Pluggage is a problem when the fed material is a solid. Solids are usually fed as particles suspended in or carried by a carrier gas. When using multiple lances, if pluggage is suspected, the practitioner cannot determine which lance is plugged without inspecting each lance. Such lance-by-lance inspection is time consuming and can require shutting down the entire lance array to enable inspection. Thus, there is a need for a process and apparatus to enable monitoring each lance for pluggage so that the offending lance can be identified, removed from service and de-plugged, all without affecting the operation of the remaining lances.

SUMMARY OF THE INVENTION

This invention relates to a system including a duct or chamber sized and configured so that a gas stream may flow therethrough, at least one wall of the duct or chamber defining one or more duct openings. The system also includes one or more elongated lances disposed in each duct opening, at least one of the elongated lances in fluid communication with (i) a feed comprising a particulate solid and a carrier gas from a source exterior of the duct and (ii) the interior of the duct or chamber at a point that intersects at least a portion of the gas stream when flowing. Each elongated lance defines at least a longitudinal bore through which, at least in part, the fluid communication occurs, and one or more openings. The system further includes at least one detection device associated with a respective elongated lance. The detection device is adapted for monitoring the flow rate, or a parameter indicative of flow rate, of the feed when the feed flows through the longitudinal bore of the elongated lance, The detection device is capable of detecting a reduction of the flow rate of the feed, the reduction being significant enough to indicate reduced flow of the feed through the elongated lance. Such lances are particularly useful when an array of lances is used and the feed through the lance is prone to pluggage under normal operating conditions, e.g., a feed of activated carbon particles suspended in a carrier gas, such as air, for injection into a flue gas resulting from the combustion of coal for the capture of mercury.

With the lances of this invention, the flow rate may be determined by various methods. In one such method, the operator notes the temperature output from a temperature monitor. A change in temperature is reported by the temperature monitor. This change in temperature is reported by a thermocouple coupled to a heating element, commonly referred to as a "hot wire." A decrease in the flow rate reduces the cooling of the flowing feed gas, which increases the temperature of the "hot wire" which is sensed by the thermocouple and relayed to the temperature monitor. The operator can act on this indication, close down the offending lance and repair it as is needed. Since the monitoring is specific as to each lance there is no need to interrupt the operation of all lances in an undirected search for the offending lance as would be the case if the lances were not each temperature monitored as provided by the lances of this invention.

The phrases "solids and carrier gases" and "solid and carrier gas" are meant to include a mixture of solids and carrier gases For example, in a preferred embodiment the processes of this invention includes the feed of a gas suspension of solids, e.g., a suspension of air and particulate activated carbon.

Although the invention relates to multiple lance configurations and feed processes, one such known lance configuration and feed process includes feeding solids/carrier gases through the wall of a gas stream carrying duct or chamber to the carried gas stream from a source exterior of the duct or chamber. This process includes:

a. locating at least one elongated lance that is in fluid communication with the feed source exterior of the duct or chamber and the interior of the duct or chamber at a point that intersects at least a portion of the carried gas stream, the lance having a longitudinal bore and terminating at a distal end opening through which the fluid communication occurs; and b. feeding the feed through the lance bore and distal end opening whereby the feed mixes with at least a portion of the carried gas stream.

Another useful lance configuration and feed process may be found in our co-filed patent application, PCT Appl. No. PCT/US2009/049980, filed Jul. 8, 2009, publication number WO 2010/006083, the disclosure of which is incorporated herein by reference. Furthermore, multiple lances may be used to increase dispersion and homogeneity of the solid and carrier gas in the carried gas stream. Good dispersion and homogeneity are especially useful when the fed solid and carrier gas is being used to capture components of the carried gas stream that are present in very small amounts. Downstream homogeneity increases the statistical probability that the component to be captured is contacted by the fed material to effect the latter's capture, be it by interstitial capture, absorption, chemical reaction, etc. If a lance becomes partially or fully plugged, it is important to recognize it and correct it as soon as possible. Otherwise, pollution control performance, for example will be degraded significantly. Further, with the use of multiple lances, sometimes ranging from about ten to fifty or more, the usefulness of this invention to quickly locate which lance or lances is/are plugged and remove the offending lance for repair in a timely and efficient manner without having to shut down the operation of all lances to search for the pluggage is highly beneficial.

This invention also relates to processes for determining if a conduit, e.g., a lance bore, for the passage of a feed comprising (i) a particulate solid and a carrier gas into a flowing gas, e.g., flue gas, is becoming at least partially plugged, the conduit being at least partially immersed in the flowing gas, the process comprising:

a. determining a flow rate, or a parameter indicative of the flow rate, of the feed through the conduit concomitant with the passage of the feed therethrough; and b. monitoring the flow rate, or the parameter indicative of the flow rate, of the feed through the conduit for a reduction of the flow rate with a detection device associated with the conduit or a feed line in fluid communication with the conduit, the reduction being significant enough to indicate reduced flow of the feed through the conduit.

Flow rates may be determined and monitored either directly or indirectly, i.e., the device used to determine or monitor the flow rate may do so by actively measuring the flow rate of the feed through the conduit or it may determine and monitor the flow rate through the collection of defined parameters, e.g., pressure and/or temperature. These parameters may be further analyzed to determine the flow rate of the feed through the conduit. Flow rates may be determined from calculations made by the practitioner, known relationships between different physical properties of the feed including pressure, volume, and/or temperature at known conditions, and other methods known to those of ordinary skill in the art.

The processes and systems of this invention are meant for handling many kinds of solids and carrier gases for feed into a carried gas stream. In addition, the processes and systems of this invention can improve many processes that are amenable to their use for contacting, e.g., by injection, a treating solid and carrier gas with a carried gas stream to effect removal or reduction of unwanted gas stream components from the gas stream.

Exemplary of (i) the solids, liquids and/or gases that can be used with the processes and systems of this invention and/or (ii) the gas stream treatments by use of the processes and systems of this invention are those disclosed in: U.S. Pat. Nos. 1,984,164; 4,500,327; 5,900,042; 6,514,907; 6,808,692; 6,818,043; 6,848,374; 6,878,358; 7,435,286; 7,507,083; US 2002/0114749; US 2004/013589; US 2005/0039598; US 2006/0204418; US 2006/0205592; US 2007/0051239; US 2007/0140940; US 2007/0180990; US 2007/0234902; US 2007/0254807; US 2008/0107579; US 2008/0134888; EP 0 277 706; and WO 2007/149867. All of the foregoing are incorporated herein by reference as if fully set forth.

These and other features, advantages and embodiments of this invention will be further apparent from the ensuing description, drawings, and appended claims.

BRIEF DESCRIPTION OF THE DRAWINGS

In each of the above figures, like numerals are used to refer to like or functionally like parts among the several figures.

FURTHER DETAILED DESCRIPTION OF THE INVENTION

Illustrative implementations of the invention are described below as they might be employed in the construction and use of a system and method for determining where and when plugging has occurred in the apparatus according to at least one implementation of the present invention. It will be of course appreciated that in the development of an actual implementation of the same, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the Figures, the present invention provides a process and system that are useful in monitoring for and detecting pluggage in a conduit for delivery of solids, liquids and/or gases through a duct or chamber wall into a flowing gas, where the pluggage may reduce or stop such delivery. Such detection is useful as it permits an operator to know exactly which conduit, or lance, in an array of lances is beginning to plug or has already plugged. Detection of the pluggage may be carried out by the detection device 52 shown in FIG. 2. It should be appreciated that other detection devices capable of determining flow rate may be used within the scope and spirit of the invention. Similarly, such detection devices may measure parameters indicative of flow rate, e.g., temperature or pressure. It will be appreciated that flow rate of the solid and carrier gas through the lance(s) may be measured directly or indirectly and still fall within the scope and spirit of the invention.

Figure 1:
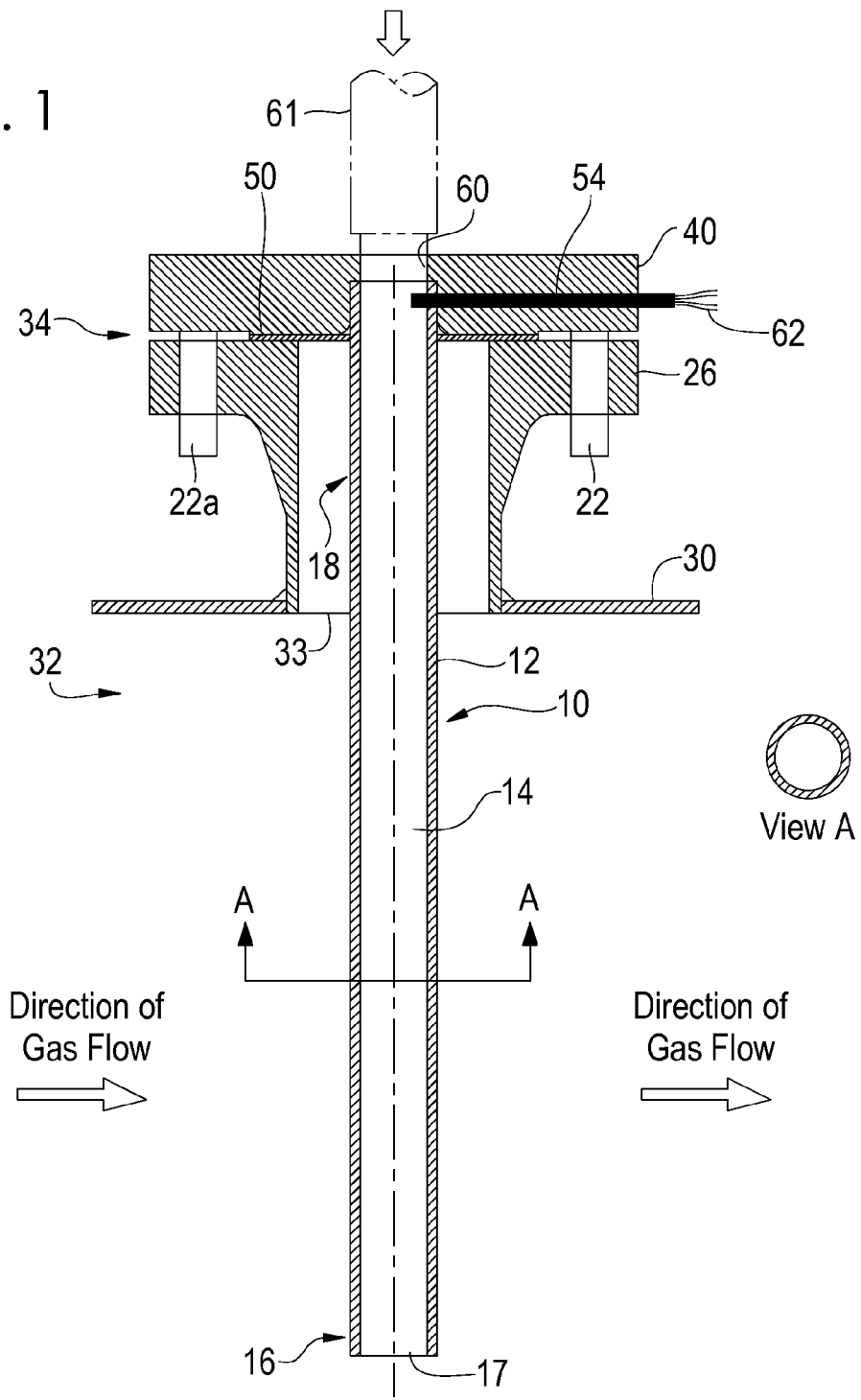
FIG. 1 is a longitudinal cross sectional view of a known elongated lance disposed in a flowing gas stream within a duct carrying a gas stream, the elongated lance having a sensor associated with the detection device of this invention disposed within the longitudinal bore of the elongated lance; latitudinal Section A-A is also provided in the Figure.

FIG. 1 illustrates an elongated lance, generally designated by the numeral 10. Lance 10 is mounted through duct wall 30 of duct 32 which is carrying a gas stream in the direction indicated by the arrows in FIG. 1. Lance 10 is mounted using a mounting flange assembly, generally designated by the numeral 34.

Lance 10 has a longitudinally extending tubular body wall 12 that defines longitudinal bore 14. (As used herein the term "longitudinal" refers to the imaginary long axis of the member or finite space described or to something aligned with such an axis, while "latitudinal" refers to an imaginary short axis substantially perpendicular to an imaginary long axis of the member or finite space described or to something aligned with such an axis.) Longitudinal bore 14 has a proximate end 18 and a distal end 16. As can be seen from the Figures, longitudinal bore 14 extends from a point exterior of duct 32, at its proximate end 18, to a point interior of duct 32, at its distal end 16. Lance 10 further forms a distal end opening 17 at its distal end 16. Typically longitudinal bore 14 will have a latitudinal diameter within the range of from about one to about ten cm. Preferably, the elongated lance is constructed of a strong metal, such as carbon or stainless steel; however, elongated lance may be constructed from other materials suitable under the circumstances.

Mounting flange assembly, generally designated by the numeral 34, is comprised of two main portions, flange 26 and flange head 40. Flange 26, for the embodiment shown in FIG. 1, surrounds duct port 33 and is conveniently mounted by welding to duct wall 30. Mounted, via bolts 22 and 22a is flange head 40 that is sized to rigidly hold lance 10 at its proximate end so that it will pass through duct port 33. Seal 50 is used to maintain a fluid tight mounting of flange head 40 to flange 26. Flange head 40 forms a flange opening 60 to receive an apparatus to feed the solid, liquid and/or gas. The apparatus used to bring the solid and carrier gas to feed flange opening 60 is shown to be a feed line 61. Generally, the feed line is any device or group of devices providing one or more passageways which convey the feed from a feed source (not shown), such as a silo. Feed line 61 may be a rigid or flexible tube as would be provided by the skilled artisan. The size of the flange opening 60 is such that it can supply the flow desired for passage through lance bore 14.

In operation, a feed comprised of a suspension of carrier gas and particulate activated carbon, is introduced through flange opening 60 and into lance bore 14. The suspension flows through the longitudinal bore through the distal end opening 17 of bore 14 whereby at least a portion of the suspension mixes with at least a portion of the carried gas stream.

Duct cross-sectional areas are commonly large (e.g., 2 meters by 2 meters, or larger), and long elongated lances are required to introduce materials across their latitudinal cross sections. In these cases, a plurality of elongated lances may be deployed in the form of array. When an array of lances is used, the lances are preferably oriented and spaced to provide an even distribution distal bore ends that intersect the gas stream flow. The lances in the array need not be of the same length. The lances can be spaced radially around and over a length of the gas stream flow. The number, length, and location of each elongated lance may vary based on the characteristics of the flue gas, such as the locations in the duct where higher volumes and concentrations of mercury exist. The numbers, locations, and lengths of the elongated lances may be optimized from the characteristics of the flue gas to increase the amount of sorbent directed to those locations in the duct where higher volumes and concentrations of mercury exist.

Figure 2:
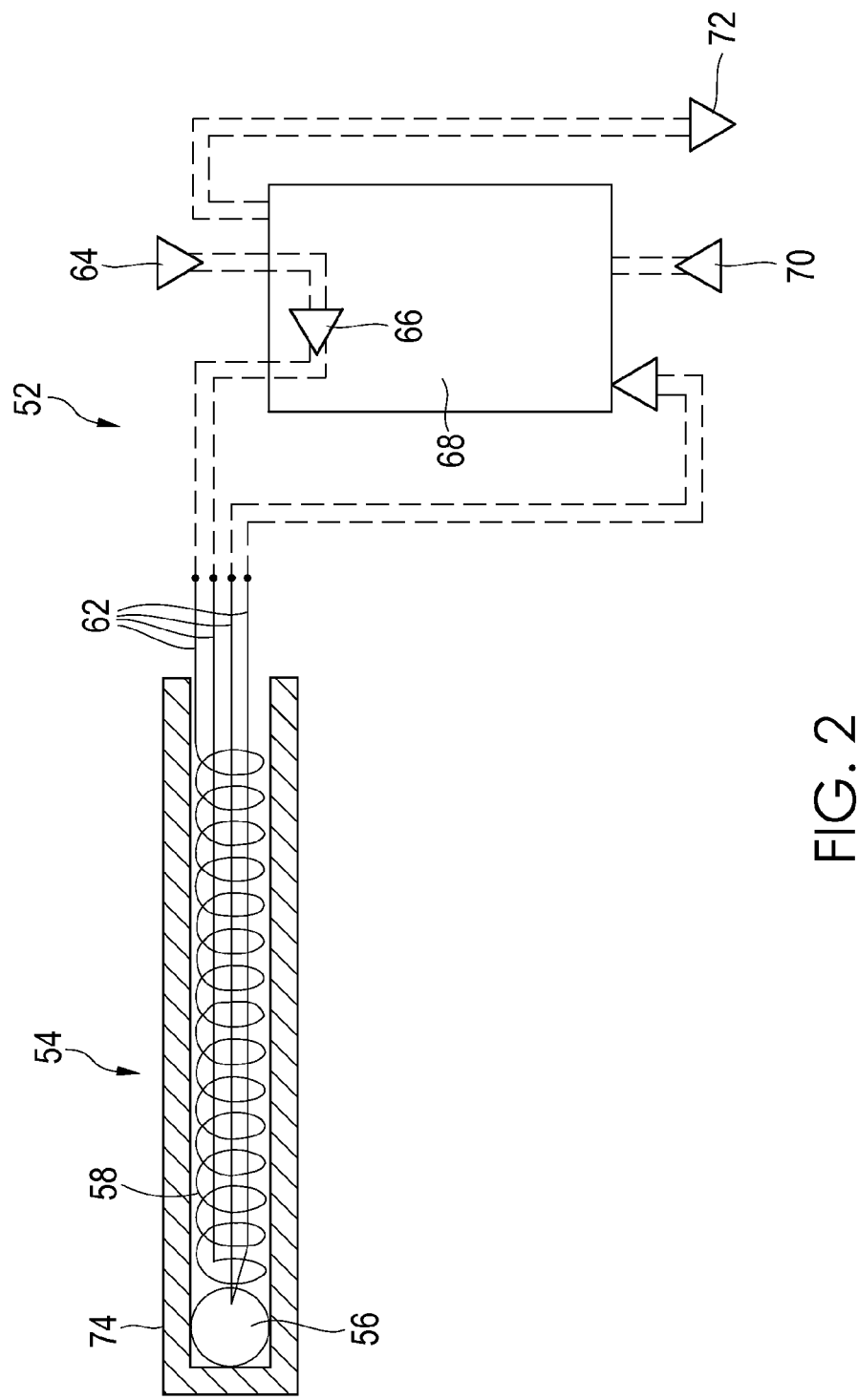
FIG. 2 is a partial cross sectional view of a flow rate monitoring and detection device of this invention.

As shown in FIG. 1 and/or FIG. 2, detection device 52 associated with elongated lance 10 includes a temperature sensor 54 disposed within lance bore 14. Temperature sensor 54 can be of any type of device capable of communicating the temperature or a temperature change within lance bore 14. From the points of simplicity and economy, a thermocouple 56 and a cartridge heater 58 both enclosed within a ceramic or metallic sleeve 74 can be used. It should be appreciated that other heating elements may be used. Wiring 62 for each of the heater 58 and the thermocouple 56 are electrically insulated from each other and exit from the same end of the temperature sensor 54. Sleeve 74 protects the heater and thermocouple by providing abrasion protection. The temperature sensor 54 is placed proximate and/or within the longitudinal bore 14 of the elongated lance 10. The sensor may be placed within the longitudinal bore permanently or may be disposed within the bore temporarily. An electrical current flows through heater 58, commonly referred to as a "hot wire," establishing a pre-determined temperature of heater 58. This pre-determined temperature is maintained at a constant temperature by a temperature monitor 68, discussed below. A decrease in flow of the particle carrier gas through the longitudinal bore decrease its cooling of the hot wire and causes an increase in the temperature of the hot wire 58 and changes the electrical characteristics of the circuit accordingly. The thermocouple 56 is coupled to the hot wire 58 and converts the change in temperature to a voltage which is relayed to temperature monitor 68, discussed below.

As shown in FIG. 2, a power source 64 in detection device 52 provides electrical energy to individual heaters 58 through multi-channel relays 66 for temperature control. A temperature monitor 68 collects and analyzes temperature data inputs from the temperature sensor 54 and detects when excess temperatures occur. Temperature conditions are received from the thermocouple 56 and transferred to the temperature monitor 68. A $V_{DC}$ power supply 70 provides energy for the detection device 52. Alarm 72 demonstrating that temperatures have been exceeded may be shown at the temperature monitor or can be sent to other locations, such as to a control room (not shown) by means of global relays 66 in detection device 52.

Although the drawings illustrate one such method to detect flow rate, it should be appreciated that other methods may be employed using other detection devices to accomplish the determination and monitoring of the flow rate of the solids and carrier gases through the lance(s). One such nonlimiting example would be a pressure sensor.

Additionally, the detection device may be associated with a feed line, e.g., conveyance line, in fluid communication with the conduit. As mentioned above, the feed line will also be in fluid communication with a feed source supplying the solid particulate and carrier gas. The detection device may include a sensor disposed within the feed line to monitor the flow rate of the feed through the feed line in fluid communication with a particular lance. It should be appreciated that a sensor or any other device included in the detection device to measure and/or monitor the flow rate of the feed through the lance may be disposed within or proximate to any portion of the lance, feed line, or other component in a system that provides the feed to the lance, so long as the flow rate through the lance is determinable at that portion. Furthermore, the term "associated with" in the context of describing the detection device's relationship to the conduit or feed line may include any configuration of a detection device or component thereof which is in proximity or connected to, or otherwise in communication with, a flow of material within the conduit and/or feed line so that a characteristic of the flow of material can be measured by the detection device.

As before noted, this invention relates to a process for determining if a conduit, such as lance 10, used for the passage of a solid and carrier gas into a flowing gas is becoming plugged. The conduit or elongated lance is at least partially immersed in the flowing gas. In one useful application, gas passing through the conduit is a gas containing particulate solids wherein the particulate solids include powdered activated carbon. Other particulate solids may include, e.g., trona or hydrated lime or the like. It should be appreciated that any particulate solid may be used that is an absorbent or reactive material capable of absorbing or reacting with a component of the flowing fluid. The flowing fluid may comprise a flue gas from a combustion process containing both particulate solids and multiple gaseous components. The flowing fluid may be a flue gas effluent comprising, e.g., mercury, hydrochloric acid, or sulfur trioxide components.

The following example is presented for purposes of illustration, and are not intended to impose limitations on the scope of this invention.

EXAMPLE 1

One example of a useful application of the invention is in treating a power plant flue gas containing mercury by injecting a bromine gas treated particulate mercury sorbent into the flue gas in combination with a carrier gas through a series of elongated lances. A temperature sensor (in this case, a hot-wire device) was inserted and remained permanently installed at the entrance of the elongated lance, where a mixture of a mercury-control sorbent in particle form and air was supplied to the elongated lance for dispensing to the flue gas passing through a large flue gas duct. Under normal operating conditions, the temperature of the flue gases was in the range of 300° F. (149° C.) to 400° F. (204° C.); the temperature of the sorbent/air mixture was about 120° F. (49° C.); and the temperature sensor was maintained at 500° F. (260° C.). If the flow rate of sorbent/air were increased, the temperature measured by the sensor would decrease. If the flow rate of the sorbent/air were decreased (as is the case when plugging occurs) or if the flow rate actually stopped (as is the case when complete plugging occurs), the temperature measured by the sensor would increase. In the latter case, the temperature rise can be significant. The temperature conditions actually observed during normal conditions and during a large plugging problem are shown below in Table 1.

TABLE 1

| Normal Operation - | Elongated lance operating satisfactorily delivering constant stream of solid particles to flue gas duct. |
|---|---|
| Temperature of particulates/gas feed | 120° F. (49° C.) |
| Temperature of Sensor | 500° F. (260° C.) |
| Temperature of Flue gas | 300-400° F. (149-204° C.) |
| Plugging Problem - | Elongated lance not operating satisfactorily no solid articles delivered to flue gas duct. |
| Temperature of particulates/gas feed | 90° F. (32° C.) |
| Temperature of Sensor | 1600° F. (871° C.) |
| Temperature of Flue gas | 300-400° F. (149-204° C.) |

It is to be understood that the reactants and components referred to by chemical name or formula anywhere in this document, whether referred to in the singular or plural, are identified as they exist prior to coming into contact with another substance referred to by chemical name or chemical type (e.g., another reactant, a solvent, or etc.). It matters not what preliminary chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical operation or reaction or in forming a mixture to be used in conducting a desired operation or reaction. Also, even though an embodiment may refer to substances, components and/or ingredients in the present tense ("is comprised of", "comprises", "is", etc.), the reference is to the substance, component or ingredient as it existed at the time just before it was first contacted, blended or mixed with one or more other substances, components and/or ingredients in accordance with the present disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation within the spirit and scope of the appended claims.

The invention claimed is:

1. A process for determining if a conduit for the passage of a feed comprising (i) a particulate solid and (ii) a carrier gas into a flowing gas is becoming at least partially plugged, the conduit being at least partially immersed in the flowing gas, the process comprising:
   a. determining a flow rate, or a parameter indicative of the flow rate, of the feed through the conduit concomitant with the passage of the feed therethrough; and
   b. monitoring the flow rate, or the parameter indicative of the flow rate, of the feed through the conduit for a reduction of the flow rate with a detection device associated with a temperature sensor and with the conduit or a feed line in fluid communication with the conduit, the reduction being significant enough to indicate if the conduit is becoming at least partially plugged, wherein said detection device comprises a hot wire having a pre-determined temperature such that an increase in the temperature measured by the sensor as compared to the pre-determined temperature indicates a reduction of the flow rate.

2. The process of claim 1 wherein the particulate solid comprises an absorbent or reactive material capable of absorbing or reacting with a component of the flowing gas and the flowing gas comprises a flue gas from a combustion process.

3. The process of claim 2 wherein the component of the flue gas comprises mercury, hydrochloric acid or sulfur trioxide.

4. A system comprising
   a duct or chamber sized and configured so that a gas stream may flow therethrough, at least one wall of the duct or chamber defining one or more duct openings;
   one or more elongated lances disposed in each duct opening, at least one of the elongated lances in fluid communication with (i) a feed comprising a particulate solid and a carrier gas from a source exterior of the duct and (ii) the interior of the duct or chamber at a point that intersects at least a portion of the gas stream when flowing, each elongated lance defining at least a longitudinal bore through which, at least in part, the fluid communication occurs, and defining at least one or more openings; and
   at least one detection device associated with a temperature sensor and with a respective elongated lance,
   wherein the detection device comprises a hot wire having a pre-determined temperature such that an increase in the temperature measured by the sensor as compared to the pre-determined temperature indicates a reduction of the flow rate of the feed, the reduction being significant enough to indicate if the duct or chamber is becoming at least partially plugged.

5. The system of claim 4 wherein the particulate solid comprises an absorbent or reactive material capable of absorbing or reacting with a component of the flowing gas and the flowing gas comprises a flue gas from a combustion process.

6. The system of claim 5 wherein the component of the flue gas comprises mercury, hydrochloric acid or sulfur trioxide.

7. The system of claim 4 wherein the detection device comprises a sensor disposed within or proximate to the longitudinal bore to measure a feed flow rate through the elongated lance.

* * * * *